United States Patent [19]

Powell

[11] Patent Number: 4,561,187
[45] Date of Patent: Dec. 31, 1985

[54] VEHICLE FRAME ALIGNMENT GAUGE

[76] Inventor: Robert F. Powell, 4809 Laketon Ct., St. Louis, Mo. 63128

[21] Appl. No.: 603,091

[22] Filed: Apr. 23, 1984

[51] Int. Cl.[4] .............................................. G01B 5/25
[52] U.S. Cl. ................................ 33/288; 33/180 AT
[58] Field of Search ........... 33/180 AT, 181 AT, 288, 33/286, 228

[56] References Cited

U.S. PATENT DOCUMENTS 4,319,402  3/1982  Martin ............................. 33/181 AT
4,321,754  3/1982  Colby ..................................... 33/288
4,342,154  8/1982  Legrand ......................... 33/180 AT
4,447,961  5/1984  Valat ............................... 33/180 AT Primary Examiner—Willis Little
Attorney, Agent, or Firm—Drummond & Nissle

[57] ABSTRACT

An improved vehicle frame alignment gauge. The gauge can be readily installed and operated by a single mechanic. The gauge does not have to be attached to and suspended from a vehicle frame and does not have to be readjusted while the frame is being stressed to alter the shape of the frame.

2 Claims, 15 Drawing Figures

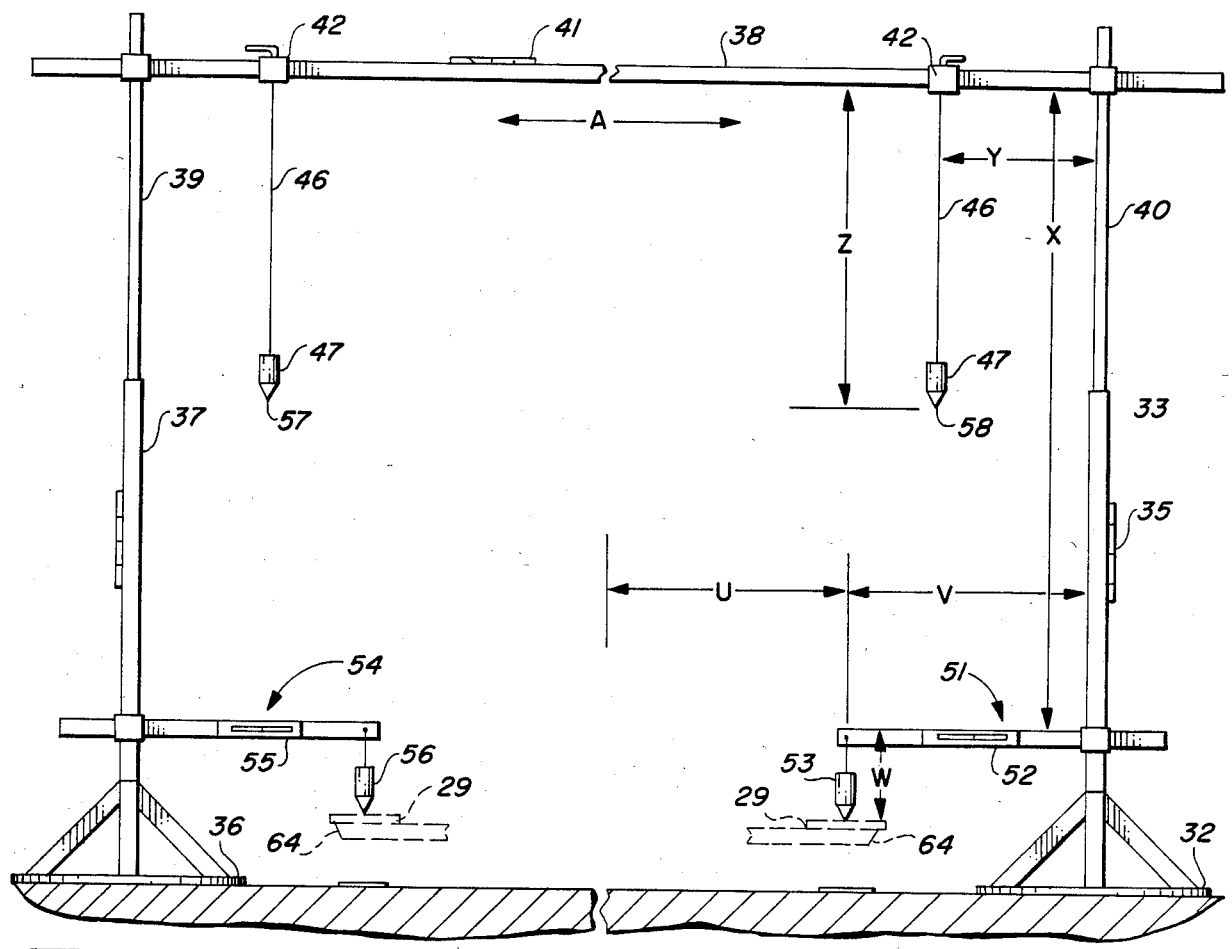
FIG. 10
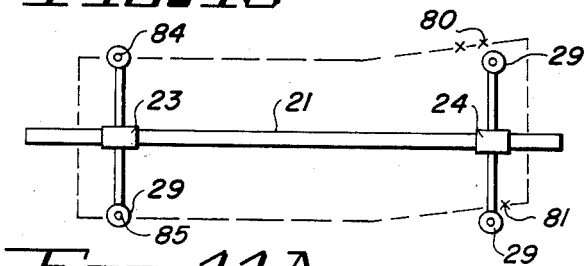
FIG. 11A
FIG. 12A
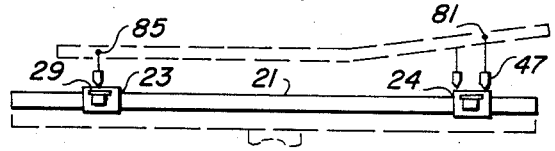
FIG. 12B
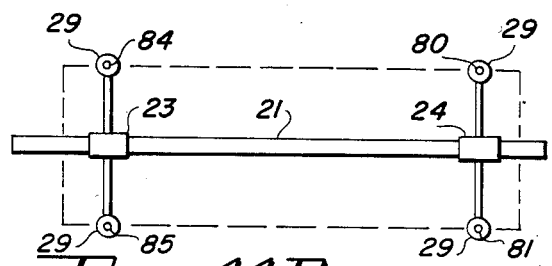
FIG. 11B
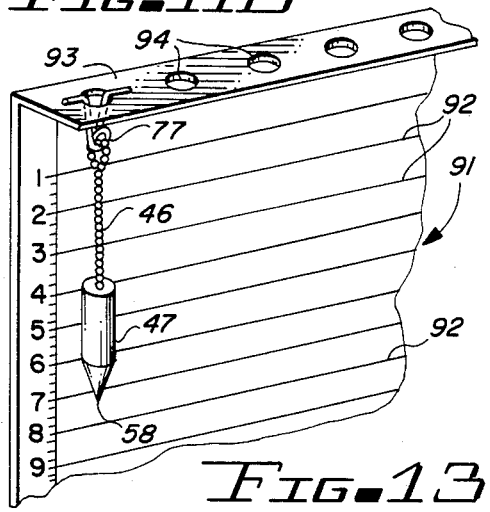
FIG. 13

VEHICLE FRAME ALIGNMENT GAUGE

This invention pertains to apparatus for adjusting the shape of a frame.

More particularly, the invention pertains to a gauge which is used in realigning the frame of a vehicle.

In another respect, the invention pertains to a vehicle frame alignment gauge which, in use, does not have to be attached to and suspended from a vehicle frame and does not have to be readjusted while the frame is being stressed to alter the shape of the frame.

In a further respect, the invention pertains to vehicle frame alignment apparatus which can be readily installed and operated by one mechanic.

In yet still another respect, the invention pertains to a vehicle frame alignment gauge which permits the length of a vehicle frame to be quickly determined by a mechanic without his having to use a tape or other measuring instrument.

In yet a further respect, the invention pertains to vehicle frame alignment apparatus which, in use, does not require that a mechanic visually align a plurality of spaced apart pointers on the apparatus and therefore does not require that a mechanic have a good "gun eye" in order to accurately realign the frame of a vehicle.

A wide variety of gauges have been developed to facilitate the realignment of bent vehicle frames. See for example, U.S. Pat. Nos. 2,798,296 to Liskey, 4,006,532 to Hallman, 3,983,635 to Jarman, 3,869,804 to Friend, 4,165,567 to Olsson, and 4,342,154 to Legrand. There are several drawbacks normally associated with the utilization of a prior art vehicle frame alignment gauge. First, the gauge must be directly attached to the frame of a vehicle and then, after appropriate measurements have been made, must be removed from the frame before stress is applied to the frame to alter the shape of the frame. After the frame has been stressed, the alignment gauge is reattached to the frame and the measurement process repeated. If the new measurements indicate that the frame has not been bent to the desired shape, the alignment gauge must again be removed and the frame subjected to further stress. Since the alignment gauge is usually attached to and removed from the vehicle frame several times before the frame has been properly realigned, using a prior art alignment gauge to straighten a vehicle frame is a time consuming process.

Another drawback commonly associated with existing vehicle frame alignment gauges is that a mechanic must, in using such a gauge, visually align a plurality of spaced apart pointers adjustably mounted on the gauge. Since many individuals do not have a good "gun eye" and cannot accurately visually align the pointers, such prior art alignment gauges cannot consistently be used to accurately realign a damaged vehicle frame.

A further disadvantage of prior art vehicle frame alignment gauges is that they do not measure the length of a vehicle frame. Consequently, when prior art alignment gauges are employed, a tape or other auxiliary measuring instrument must be used to determine the length of a frame. Utilizing a measuring tape typically requires the presence of two mechanics. Determining the frame length is important because it indicates whether the frame has been compressed. When the frame has been compressed, stress is applied to stretch the frame to its original shape.

Accordingly, it would be highly desirable to provide an improved vehicle frame alignment gauge which would require that only a single mechanic be present to install and operate the gauge, and which would not require that the gauge be attached to and removed from the vehicle during the process of aligning the frame thereof.

It would also be highly desirable to provide an improved vehicle frame alignment gauge which would, after it was adjusted for a particular vehicle frame, not have to be readjusted as the frame was repeatedly stressed to return the frame to its original shape.

Therefore, it is a principal object of the invention to provide improved apparatus for adjusting the shape of a frame.

A further object of the invention is to provide an improved vehicle frame alignment gauge which accurately indicates when a damaged vehicle frame has been realigned to its original shape, contour and dimension.

Another object of the instant invention is to provide an improved vehicle frame alignment gauge which does not have to be attached to and removed from a vehicle during the process of aligning the frame thereof.

Still another object of the invention is to provide an improved vehicle frame alignment gauge which requires that only a single mechanic be present to install and operate the gauge.

Yet a further object of the invention is to provide an improved vehicle frame alignment gauge which, after being installed and initially adjusted for a particular vehicle frame, does not have to be readjusted when the frame is repeatedly stressed to return the frame to its original shape.

These and other, further and more specific objects and advantages of the invention will be apparent to those skilled in the art from the following detailed description thereof, taken in conjunction with the drawings, in which:

FIG. 3 is a section view of a portion of the apparatus of FIG. 1 taken along section line 3—3 thereof and further illustrating interior construction details thereof;

FIG. 5 is an enlarged perspective view of a portion of the apparatus of FIG. 1 illustrating the attachment of plumb bob means through a reference aperture formed upwardly through the frame of a vehicle;

FIG. 10 is a front view of a portion of the vehicle frame alignment apparatus of FIG. 1;

FIG. 11A is a top view illustrating the orientation of the vehicle frame alignment gauge of the invention with respect to a bent vehicle frame;

FIG. 11B is a top view of the apparatus and frame of 11B illustrating the relationship therebetween after said bent vehicle frame has been straightened;

FIG. 12A is a side view of the alignment apparatus and vehicle frame of FIG. 11A;

FIG. 12B is a side view of the alignment apparatus and vehicle frame of FIG. 11B; and FIG. 13 is a perspective view of a stand utilized to store and adjust the length of plumb bob means utilized in the presently preferred embodiment of the invention.

Briefly, in accordance with my invention, I provide improved apparatus for facilitating the adjustment of a frame from a first shape to a second shape. The frame has reference points which are in a first orientation with respect to one another when the frame has the first shape and which are in a second orientation with respect to one another when the frame has the second shape. The improved apparatus includes an elongate datum member adapted to be positioned below the frame; a plurality of datum bars mounted on the datum member for selective adjustment to positions therealong; plumb bob means attached to and suspended from each of the reference points on the frame, the plumb bob means having a pointed lower end remote from the frame; and, target means on the remote end of each datum bar. The datum bars each extend outwardly from the datum member, have an end remote from the datum member, and are formed such that the distance of the remote end of the datum bar from the datum member can be selectively adjusted. The target means on each datum bar is mounted on the remote end thereof. Each target means is operatively associated with one of the plumb bob means and has a point thereon designating the proper position of the pointed end of the plumb bob means when the frame has been adjusted from the first shape to the second shape and the reference points on the frame are in the second orientation with respect to one another.

The apparatus of the invention may also include an upstanding vertically oriented member having an upper portion and a lower portion; an elongate rod which is attached to the lower portion of the vertically oriented member, extends outwardly from the vertically oriented member, and has an end remote from the vertically oriented member and positioned over a point on the target means on the remote end of one of said datum bars; an elongate arm which is attached to the upper portion of the vertically oriented member, extends outwardly from the vertically oriented member, and has plumb bob means attached thereto and suspended therefrom, the plumb bob means having a pointed lower end remote from the elongate arm. The position of the pointed end of the plumb bob means attached to the elongate arm corresponds to the desired position of one of the reference points when the frame has been adjusted from the first shape to the second shape and the reference points are in the second orientation with respect to one another.

Figure 1:
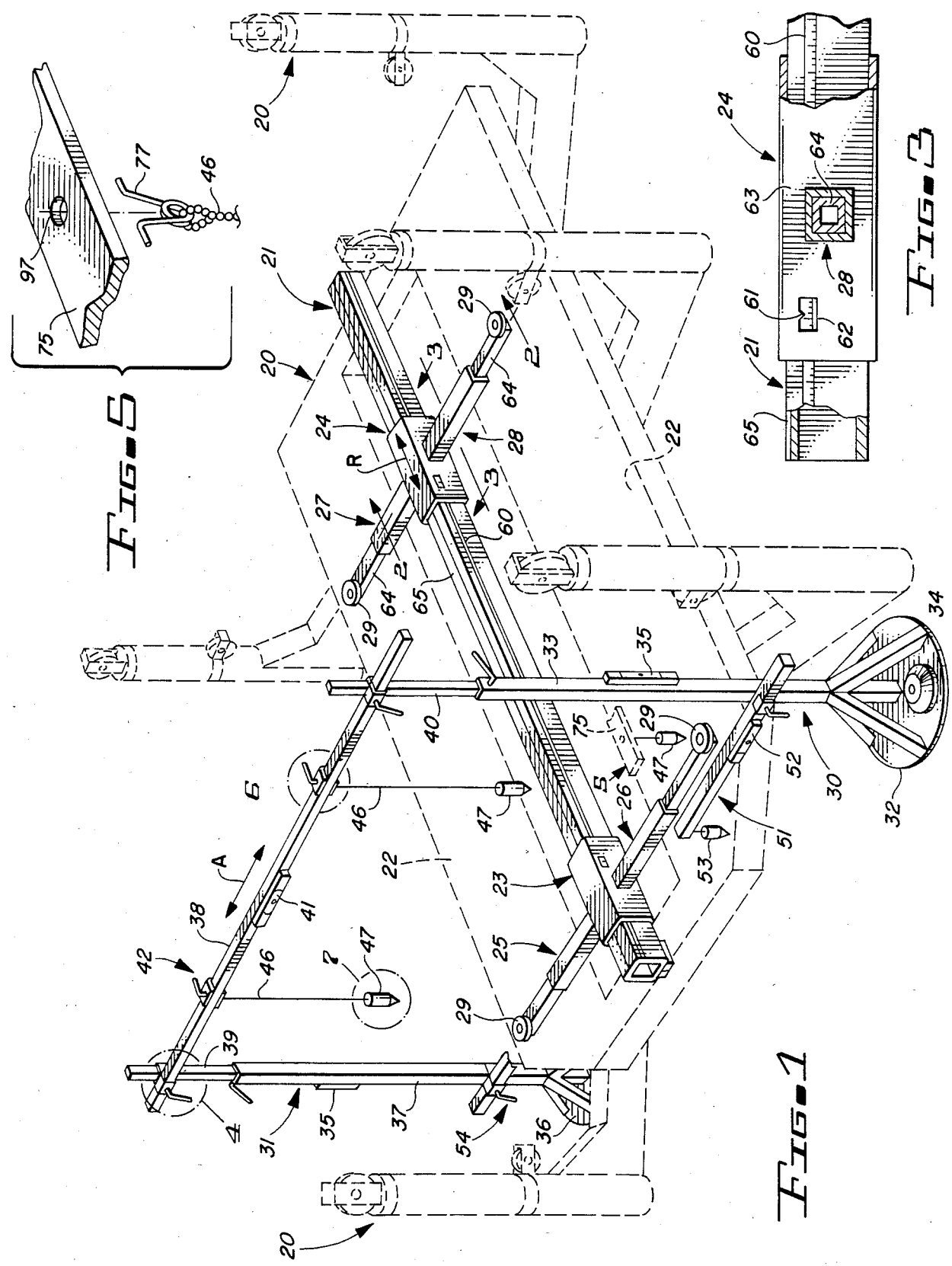
FIG. 1 is a perspective view of apparatus constructed in accordance with the invention and positioned on conventional vehicle frame straightening apparatus, the conventional frame straightening apparatus being represented in FIG. 1 by dashed lines.

Turning now to the drawings, which depict the presently preferred embodiments of the invention for the purpose of illustrating the practice thereof and not by way of limitation of the scope of the invention, and in which like reference characters represent corresponding elements throughout the several views, FIG. 1 illustrates apparatus constructed in accordance with the invention and positioned on and adjacent to a conventional vehicle frame straightening rack represented by dashed lines 20. Rack 20 includes horizontally disposed floor 22. The procedure for utilizing rack 20 to straighten the frame of an automobile or other vehicle positioned on floor 22 is well known in the art. The frame straightening rack depicted by dashed lines 20 in FIG. 1 is called the "SQUARE LINER" and is manufactured by Square Liner 360°, Inc. of 7407 Wayzata Boulevard, Minneapolis, Minn. 55426.

The apparatus of the invention includes elongate datum member 21 generally positioned along the longitudinal centerline of floor 22 of rack 20. If appropriate, member 21 can be positioned beneath floor 22. A plurality of sleeves 23, 24 are slidably mounted on member 21. Each sleeve 23, 24 is provided with a pair of arms 25, 26 and 27, 28 which slidably receive a telescoping arm 64. The outer end of each arm 64 carries circular target 29. Stand 30 includes circular base 32 and vertically oriented member 33 slidably receiving telescoping rod 40. Base 32 and member 33 are provided with bubble levels 34, 35 for insuring that base 32 is level and member 33 is vertically oriented. Stand 31 includes circular base 36 and vertically oriented member 37 slidably receiving telescoping member 39. Base 36 and member 37 are provided with bubble levels which are utilized to insure that case 36 is level and member 37 is vertically oriented. Although not shown in the drawings, bases 32, 36 are each equipped with three setscrews which pass through the bases and contact the ground. Each base 32, 36 can be leveled by adjusting these setscrews. One end of crossbar 38 is slidably connected to telescoping end 39 of vertical member 37. The other end of crossbar 38 is slidably attached to telescoping end 40 of vertical member 33. Bubble level 41 on member 38 is utilized to insure that member 38 is level.

Figure 6:
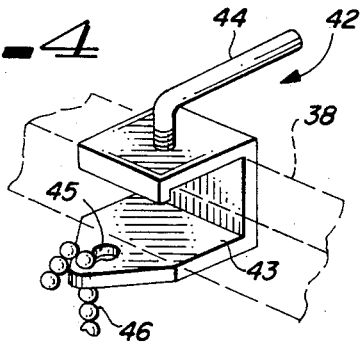
FIG. 6 is an enlarged perspective view of a bracket slidably mounted on the apparatus of FIG. 1, the bracket being adapted for the attachment of a plumb bob thereto.
Figure 7:
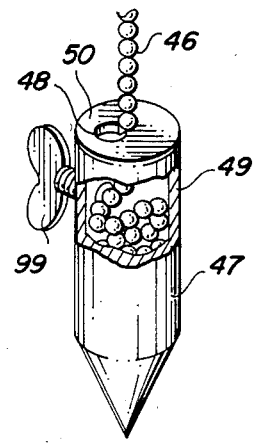
FIG. 7 is an enlarged perspective view of a plumb bob utilized in the presently preferred embodiment of the invention.

Brackets 42 (FIG. 6) are slidably carried on crossbar 38 and include U-shaped member 43 and setscrew 44. Setscrew 44 is utilized to secure member 42 in position on bar 38. When setscrews 44 are loosened, brackets 42 can be slid along bar 38 in directions of travel indicated by arrows A in FIG. 1. Keyhole aperture 45 is formed through member 43 such that one end of chain 46 can be quickly latched in the narrow part of aperture 45. The links of chain 46 readily pass through the larger portion of aperture 45. Plumb bob 47 is attached to the lower end of each chain 46. As illustrated in FIG. 7, plumb bobs 47 each include a hollow compartment 49 for storing chain 46. Keyhole apertures 48 on the upper surface of each plumb bob 47 permit ready adjustment of the length of chain between upper surface 50 of plumb bob 47 and aperture 45 of member 42.

In FIG. 10 horizontal arm 51 is slidably attached to the lower portion of vertical member 33 and is provided with bubble level 52. Bubble level 52 is utilized to insure arm 51 is horizontally oriented. Plumb bob 53 is attached to the outer end of arm 51. Vertical member 37 is provided with horizontally disposed arm 54 which includes bubble level 55. Level 55 is utilized to insure arm 55 is in a horizontal position. Plumb bob 56 is attached to the outer end of arm 54. Arm 54 is slidably connected to member 37. Arms 51, 54 are generally parallel to crossbar 38 and can, as can bar 38, be slidably adjusted in the directions indicated by arrows A in FIGS. 1 and 10.

Figure 2:
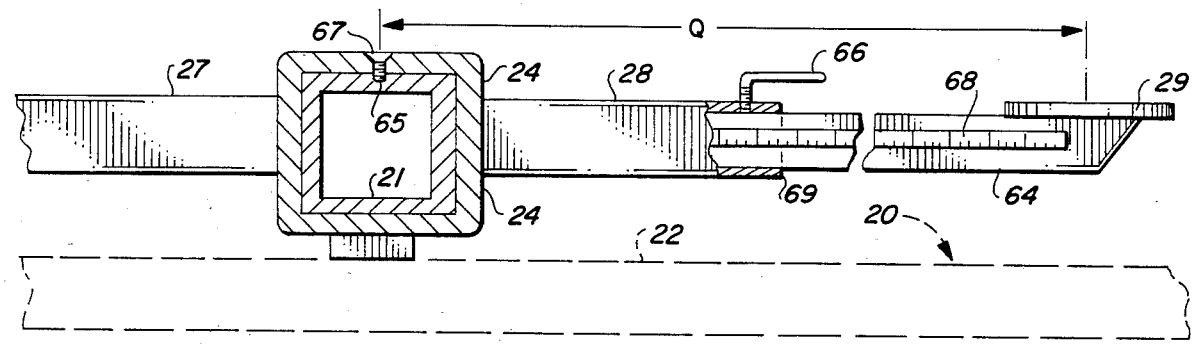
FIG. 2 is a section view of a portion of the apparatus of FIG. 1 taken along section line 2—2 thereof.

FIG. 3 illustrates construction details of slide member 24 and datum member 21. Datum member 21 is provided with elongate inch scale 60. The position of sleeve 24 on member 21 can be determined by reading the position of pointer 61 on scale 60. Pointer 61 is formed in aperture 62 passing through side wall 63 of member 24. Hollow arm 28 is fixedly perpendicularly secured to side wall 63 of member 24. Arms 25, 26, 27 are similarly perpendicularly secured to slides 23, 24. Telescoping bar 64 is slidably received by arm 28. If desired, a threaded aperture can be formed through arm 28 to receive a setscrew 66 (FIG. 2). Setscrew 66 is utilized to secure bar 64 in a desired position with respect to arm 28. The distance of target 29 from datum member 21 is adjusted by sliding arm 64 toward or away from member 21. Elongate groove 65 is formed in and extends along the top surface of datum member 21. As can be seen in FIG. 2, set screw 67 in sleeve 24 is tightened into groove 65 to secure sleeve 24 in a desired position along member 21.

In FIG. 2, arm 64 is provided with inch scale 68. The distance from the center of target 29 to an imaginary vertical plane passing through the longitudinal centerline of member 21 is indicated by arrows B. In FIG. 2 the imaginary vertical plane passing through the longitudinal centerline of member 21 passes through groove 65 and is perpendicular to the plane of the paper of the drawings. Scale 68 is constructed such that distance B can be determined by reading scale 68 at the end of arm 28, i.e., by reading scale 68 just above point 69. Telescoping arms 64 associated with members 25-27 are similarly provided with scales 68 which permit the ready determination of the distance from groove 65 of the center points of targets 29 carried thereon.

Figure 4:
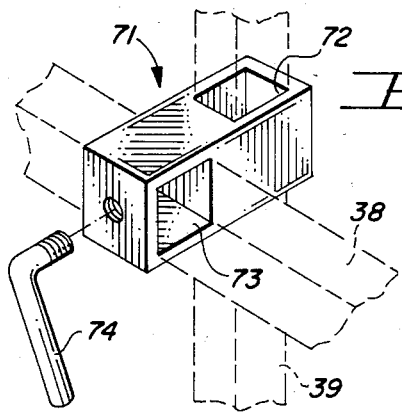
FIG. 4 is an enlarged perspective view of a portion of the frame alignment apparatus of FIG. 1.

FIG. 4 illustrates bracket 71 utilized to slidably interconnect member pairs 38 and 39, 38 and 40, 33 and 51, and 54, 57. Rectangular apertures 72, 73 formed through bracket 71 are shaped to slidably receive one of members 37-40, 33, 51 or 54. Setscrew 74 is utilized to secure a member slidably received by aperture 73. Although not shown, aperture 72 is also provided with a setscrew for securing a member slidably received therein.

Figure 8:
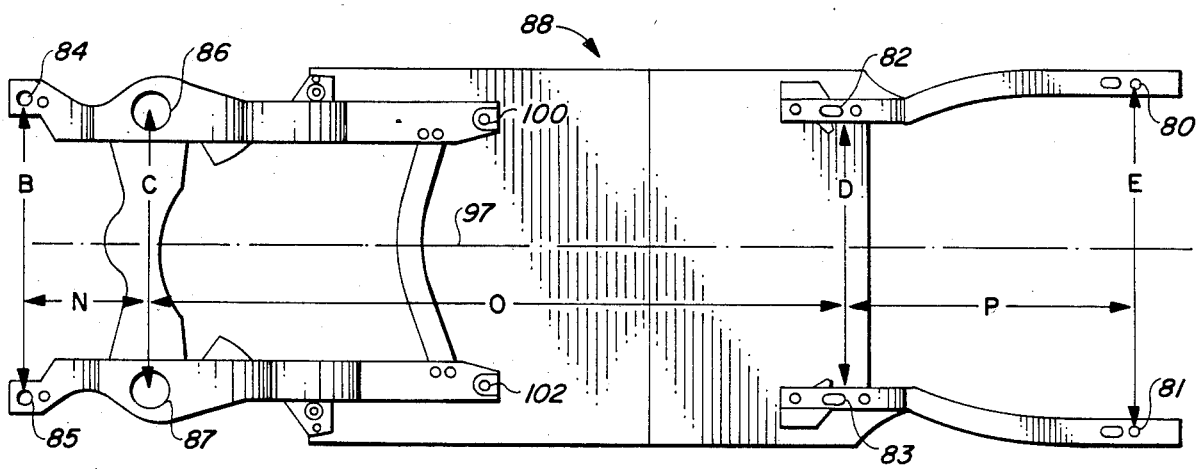
FIG. 8 is the top view of a conventional vehicle frame.
Figure 9:
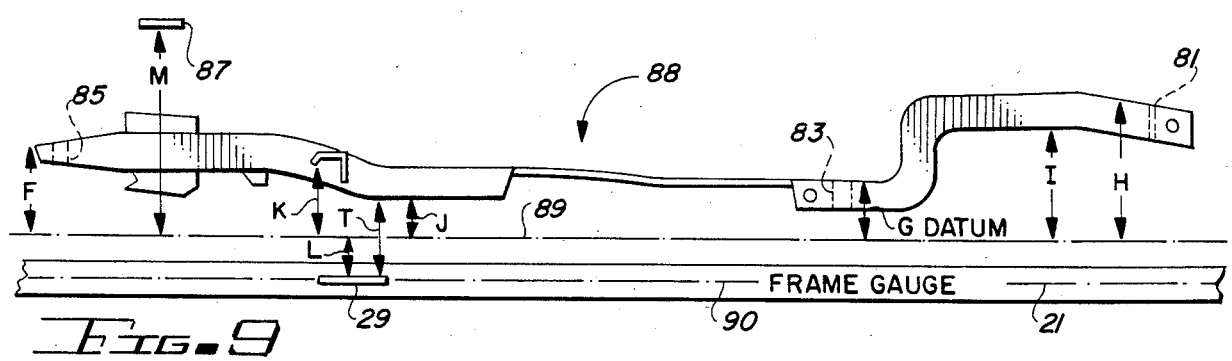
FIG. 9 is a side view of the frame of FIG. 8 illustrating the relationship thereof to imaginary primary and secondary datum lines utilized in the practice of the invention.

As is well known by those of skill in the art, "frame books" are readily available which picture and dimension the basic body frame of each of various makes of automobiles. FIGS. 8 and 9 depict the frame of a 1979 Chevrolet Camaro in the manner normally found in a commercially available frame manual. The frame includes reference apertures 80-85 formed therethrough. Circles 86, 87 represent the position of the top ends of MacPherson struts carried by the frame. Arrows B, D, E represent the distances separating aperture pairs 84 and 85, 82 and 83, and 80, 81, respectively. Arrows C represent the distance between the centerpoint of the top ends 86, 87 of the MacPherson struts. One-half of the distance represented by arrows B equals the distance from each reference aperture 84, 85 to line 97. Line 97 represents an imaginary vertical plane which bisects the frame of FIG. 8 and which is perpendicular to the plane of the paper of the drawings in FIG. 8. One-half of the distance represented by arrows D is the distance from each aperture 82, 83 to imaginary centerline 87. The distance from the center of each aperture 80, 81 to the imaginary vertical plane passing through line 87 is equal to one-half the distance represented by arrows E. Similarly, one-half the distance represented by arrows C is equivalent to the distance from the center of each top portion 86, 87 to centerline 87.

In FIG. 9, the vertical position of each aperture 85, 83, and 81 with respect to an imaginary horizontal plane passing through imaginary primary datum line 89 is indicated by arrows F, G and H, respectively. In FIG. 9 the imaginary horizontal plane passing through line 89 is perpendicular to the plane of the paper of the drawings. The vertical position of each aperture 84, 82, 80 with respect to the horizontal plane passing through datum line 89 is also indicated by arrows F, G and H. The position of the primary datum line 89 is arbitrarily selected in commercially available frame manuals. Line 89 is typically selected to be five to six inches beneath the lowest portion of the frame. Thus, in FIG. 9, distance J would probably be assigned a value of five to six inches.

During utilization of the apparatus of the invention, member 21 is, as shown in FIG. 9, normally positioned a known distance beneath the vehicle frame and beneath imaginary primary datum line 89. In FIG. 9 arrows L represent the known distance from primary datum line 89 to the secondary datum line 90. Secondary datum line 90 represents an imaginary horizontal plane passing through the centerpoints of targets 29. In FIG. 9, the imaginary horizontal plane passing through the centerpoints of targets 29 is perpendicular to the plane of the paper of the drawings.

Although elongate datum member 21 shown in FIG. 1 comprises a single unitary member, member 21 can consist of two or more separate members attached to or positioned adjacent one another to form member 21. It is also anticipated that member 21 would be provided with at least four or more sliding sleeve units 23 each having adjustable arms carrying a target 29.

A storage rack for plumb bobs 47 is illustrated in FIG. 13 and includes vertically oriented panel member 91 having horizontal lines 92 formed thereon at vertical one inch intervals. Upper lip 93 includes apertures 94 formed therethrough to receive V-shaped spring clips 77 carrying chain lengths 46. Chains 46 are each connected at one end to a plumb bob 47 having tip 58. Horizontal graduations 92 on member 91 facilitate adjustment of the length of chain 46 between clip 77 and plumb bob 47 when a plumb bob unit is hanging in the storage rack in the manner illustrated in FIG. 13. The length of chain 46 between clip 77 and plumb bob 47 is adjusted by removing the chain from the small latching portion of keyhole 48 (FIG. 7) and passing chain through the large portion of keyhole 48 into or from hollow storage chamber 49 of plumb bob 47. Spring clip 77 is, after the length of chain 46 has been appropriately adjusted, removed from aperture 94 by compressing the legs of clip 77 together and withdrawing clip 77 from aperture 94. Clip 77 is then, as illustrated in FIG. 5, inserted in the appropriate reference aperture 97 in the vehicle frame. In FIG. 5, aperture 97 could correspond to reference aperture 85 or to any other reference aperture in the frame of FIGS. 8 and 9.

In operation, elongate datum member 21 is, as illustrated in FIG. 1, positioned on floor 22 of rack 20 such that elongate groove 65 of member 21 is generally above and parallel to the imaginary longitudinal centerline of floor 22. When member 21 is initially positioned on floor 22, telescoping arms 64 usually are not extended but are instead completely retracted inside hollow members 25-28 such that targets 29 are immediately adjacent the outer ends of members 25-28. After member 21 is positioned on rack 20, a vehicle is driven on to or positioned on floor 22. When a vehicle is positioned on rack 20, the centerline 97 of the undamaged portion of the vehicle frame is generally positioned parallel to and directly above groove 65 of member 21.

For purposes of the following analysis it is assumed that the vehicle positioned on floor 22 is a 1979 Chevrolet Camaro having the frame shown in FIGS. 8 and 9. It is also assumed that only the rear half of the frame has been damaged. Therefore, in FIG. 8 reference apertures 84, 85, 100 and 102 are in the undamaged portion of the frame while reference apertures 80-83 are in the damaged portion of the frame.

After the vehicle is positioned on rack 20, the distance L from the primary datum line 89 to the secondary datum line 90 (FIG. 9) is determined in relation to the undamaged portion of the vehicle frame. The shortest vertical distance from the bottom of the frame to a target 29 positioned beneath the frame is measured. This distance is represented by arrows T in FIG. 9. The distance J from the bottom of the frame to the primary datum line 89 is determined from a frame book. The difference between distances T and J equals the distance L from the primary datum line 89 to the secondary datum line 90.

When distance L has been determined the lengths of the plumb bob units to be attached to the frame reference apertures are calculated. The overall length of the plumb bob units attached to apertures 84, 85 equals distance L plus distance F; of the plumb bob unit hanging from aperture 82 and of the unit hanging from aperture 83 equals distance G plus distance L; and, of the plumb bob units hanging from apertures 80, 81 equals distance H plus distance L. The overall length of a plumb bob unit is the sum of the lengths of plumb bob 47, of clip 77, and of chain 46 connecting bob 47 and clip 77. See FIG. 13. Plumb bob units having the desired overall length are obtained using the measurement stand of FIG. 13 and are then each attached to the frame by inserting clip 77 in the appropriate reference aperture.

After plumb bob units of appropriate lengths are suspended from selected reference apertures on the vehicle frame, slides 23, 24 and telescoping arms 64 on unit 21 are adjusted to position each target 29. Each target 29 is positioned so that the centerpoint thereof corresponds to the position of one of the references apertures of the frame of FIG. 8. The frame of FIG. 8 represents the desired shape of the frame. In adjusting the positions of targets 29 the assumption is made that the imaginary vertical plane extending through groove 65 corresponds to the imaginary vertical plane represented by dashed centerline 97 in FIG. 8. As noted, the imaginary vertical plane extending through groove 65 would, in FIG. 2, be perpendicular to the plane of the paper of the drawings, and, the imaginary vertical plane extending through centerline 97 would, in FIG. 8, be perpendicular to the plane of the paper of the drawings.

By way of example, if the centerpoints of targets 29 on slide 23 are intended to correspond to the positions of apertures 84, 85 with respect to the imaginary vertical plane represented by centerline 97, arms 64 slidably carried in members 25, 26 are extended until the centerpoint of target 29 on each arm is a distance Q (FIG. 2) from the vertical imaginary plane extending through groove 65, where Q equals one-half the distance indicated by arrows B in FIG. 8. One-half of distance B equals the shortest distance from the center of each aperture 84, 85 to the vertical imaginary plane represented by centerline 87. The position of slide 23 on member 21 is then adjusted until the center points of targets 29 are immediately below and adjacent tips 58 of plumb bobs 47 hanging from apertures 84, 85. The tips of plumb bobs hanging from reference apertures 84, 85 should, when targets 29 are properly positioned, be immediately adjacent the centers of the targets because the portion of the vehicle frame which includes apertures 84, 85 is undamaged.

If the centerpoints of targets 29 carried by slide 24 are intended to correspond to apertures 80, 81 in the frame of FIG. 8, then arms 64 slidably carried by members 27, 28 are adjusted until the centerpoints of each target 29 is a distance Q (FIG. 2) from groove 65, where Q is equal to one-half the distance indicated by arrows E in FIG. 8. Since apertures 80, 81 are formed in the damaged portion of the frame, slide 24 is positioned on member 21 in relation to the position of slide 23. Thus, slide 24 is moved along member 21 until the distance between slides 23 and 24 equals the sum of the distances represented by arrows N, O, P in FIG. 8. As earlier indicated, scales 68 on each slidable arm 64 permit the ready determination of the distance Q (FIG. 2) from the centerpoint of a target to the imaginary vertical plane passing through groove 65. Similarly, scale 60 on member 21 permits the ready determination of the distance between slides 23, 24 and between the centerpoint of a target 29 carried by member 26 of slide 23 and the centerpoint of a target 29 carried by member 28 of slide 24.

The tips of plumb bobs 47 hanging from reference apertures 80, 81 will be spaced away from and not immediately adjacent the centers of their associated targets 29 on slide 24 because the portion of the vehicle frame which includes apertures 84, 85 is damaged and does not have the desired shape.

FIGS. 11A and 12A depict the positions of sleeves 23 and 24, targets 29 and reference apertures 80, 81, 84, 85 after plumb bob units have been properly sized and suspended from apertures 80, 81, 84, 85 and after the position of each target 29 has been properly adjusted in the manner described. Thus, in FIGS. 11A and 12A reference has been made to the desired frame dimensions shown in FIG. 8 targets 29 have been positioned so their centerpoints correspond to reference apertures 80, 81, 84, 85. Also, in FIGS. 11A and 12A plumb bob units of proper length have been suspended from reference apertures 80, 81, 84, 85. The tips of plumb bobs suspended from reference apertures 80, 81 are not immediately adjacent the center of circular targets 29 operatively associated therewith because the portion of the frame in which apertures 80, 81 are formed is damaged and is not in the desired shape.

After the vehicle frame alignment gauge 21, 25-29, 64, 29 and plumb bob units are positioned with respect to one another in the manner illustrated in FIGS. 11A and 12A, frame straightening rack 20 is utilized to stress the vehicle frame until tips 58 of plumb bobs 47 suspended from apertures 80, 81 are immediately adjacent the centerpoints of targets 29 carried on slide 24. When tips 48 are adjacent the centers of targets 29 on slide 24, the frame has, as shown in FIG. 11B and 12B, been realigned to the desired shape.

As would be appreciated by those of skill in the art, once datum member 21 and targets 29 thereon have been positioned to correspond to the centerline and reference apertures of a desired frame shape, targets 29 normally do not have to be readjusted during the application of stress to a frame to change the shape of the frame to the desired shape. Further, it is not necessary to attach datum member 21 to a vehicle frame in order to utilize the vehicle frame alignment gauge of the invention.

The apparatus of FIG. 10 is positioned in the following manner. Slide 23 and targets 29 thereon are, in the manner earlier described, positioned such that the centerpoints of targets 29 are immediately adjacent tips 58 of plumb bobs 47 suspended from reference apertures 84, 85. Slide 84 is positioned on datum member 21 a distance from slide 23 equal to that indicated by arrows N in FIG. 8. The distance Q (FIG. 2) from groove 65 to a targets 29 carried by slide 24 need not be equal to any particular value. The distance Q only need be known for each target 29 carried by slide 24. After slide 24 and targets 29 thereof are positioned, vertical members 35, 37 are positioned such that the lower tips of plumb bobs 53, 56 are immediately adjacent the centers of targets 29 of slide 24 as shown in FIG. 10. When the tips of plumb bobs 53, 36 are immediately adjacent their associated targets 29, the bubble levels on members 33, 37 should indicate that members 33, 37 are vertically oriented, and, levels 52, 55 should indicate arms 51, 54 are level. Level 41 is utilized to insure that crossbar 38 is also level.

The final step in positioning the apparatus of FIG. 10 is to determine the proper length of each plumb bob unit carried by brackets 42 and to determine the proper position of each bracket 42 on crossbar 38. The distance Q (FIG. 2) from groove 65 to the center of target 29 associated with plumb bob 53 is known and in FIG. 10 is represented by arrows U. Similarly, the distances represented by arrows V, W, and X are known. The height of the upper portions 86, 87 of the MacPherson struts primary datum line 89 is known and is indicated by arrows M in FIG. 9. Since the distance L from the primary datum line 89 to secondary datum line 90 is also known, the distance from upper ends 86, 87 of the MacPherson struts to the secondary datum line 90 can be determined. Therefore, the desired total length Z of a plumb bob unit carried by a bracket 42 is equal to distance X plus distance W minus the sum of the distances represented by arrows M and L in FIG. 9. The proper horizontal distance Y of chain 46 from member 40 is equal to the sum of distance V and U (FIG. 10) minus the distance equal to one-half the distance represented by arrows C in FIG. 10.

Once the apparatus of FIG. 10 is properly positioned in the manner described, tips 57, 58 of plumb bobs 47 should be immediately adjacent dimples formed in the center of upper ends 86, 87 of MacPherson struts mounted on the vehicle frame. If the dimples in top ends 86, 87 of the struts are not immediately adjacent tips 57, 58, then the vehicle frame is stressed as necessary to adjust the position of the upper portions of the struts such that the dimples in portions 86, 87 are immediately adjacent tips 57, 58. Once the apparatus of FIG. 10 has been properly positioned, it normally need not be repositioned while the vehicle frame is being stressed to change the shape of the frame to alter the positions of portions 86, 87 of the MacPherson struts.

In utilizing the apparatus of the invention plumb bobs 47 can be mounted on elongate rigid rods instead of being mounted on chains 46.

The frame alignment gauge of the invention is utilized in adjusting the shape of a frame from a first shape to a second desired shape. The frame shape illustrated in FIGS. 8 and 9 represents the desired shape of a frame. One of the steps in utilizing the apparatus of the invention is, before a frame is stressed to adjust the shape of the frame to a second desired shape, to adjust the position of targets 29 carried on datum member 21 such that the center of each target corresponds to the position of one of the reference apertures in the desired frame shape, and, consequently, so that the distance of any given target centerpoint from all other target centerpoints and from centerline 65 directly corresponds to the distance of one of the reference apertures from the frame centerline 97 and from other reference apertures in the desired frame shape. If, after targets 29 on datum member 21 are adjusted in this manner, the datum member 21 and the targets 29 carried thereon are superimposed over a frame which has been adjusted to or is in the desired shape, then centerline 65 of member 21 would be directly above and correspond to centerline 97 of the frame and the centerpoint of each target 29 would be directly above and correspond to one of the reference apertures in the frame. FIG. 11B illustrates datum member 21 and targets 29 superimposed over a frame in this manner. In FIG. 11B the desired frame shape is represented by the dashed line and the centerpoint of each target 29 is directly above and corresponds to one of reference apertures 80, 81, 84, 85.

As shown in FIG. 7, plumb bob 99 may be provided with set screw 99 having an externally threaded throat rotatably received by an internally threaded aperture passing through the cylindrical wall of bob 47. When set screw 99 is turned in a clockwise direction the threaded throat passes through the internally threaded aperture in the wall of bob 47 and against chain carried therein, preventing chain from being pulled out of chamber 49. When plumb bob 47 is provided with set screw 99, aperture 48 can, instead of having the keyhole shape shown in FIG. 7, be circular and have a diameter large enough to permit chain 46 to move freely therethrough. When bob 47 is hanging in measurement rack 91 in the manner illustrated in FIG. 13, the length of chain 46 is adjusted by loosening set screw 99 so chain can be pulled from or slid into chamber 49 through aperture 48. When the length of chain 46 has been adjusted as desired, set screw 99 is turned in a clockwise direction to secure chain 46 in chamber 49. The desired overall length of a plumb bob unit is, as earlier described, determined from a frame book and by reference to the position of member 21. For example, if a plumb bob unit were being hung from aperture 85 in FIG. 9, the overall length of the unit would be distance F plus distance L.

Dart clips 77 may be fabricated from spring steel or any other appropriate material.

Having described my invention in such terms as to enable those skilled in the art to understand and practice it, and having identified the presently preferred embodiments thereof.

I claim:

1. Measuring apparatus for facilitating the adjustment of a frame from a first shape to a second shape, said frame having reference points which are in
   a first orientation with respect to one another when said frame has said first shape, and
   a second orientation with respect to one another when said frame has said second shape, said frame having a centerline generally bisecting said frame when said reference points are in said second orientation, said apparatus including
(a) an elongate datum member having a longitudinal axis and adapted to be placed below said frame in a position parallel to said centerline thereof such that when said frame is in said second orientation said longitudinal axis generally lies in a vertical plane passing through said centerline of said frame;

(b) a carriage slidably carried on said datum member for selective adjustment to positions therealong;

(c) first and second horizontally oriented colinear elongate datum bars mounted on said carriage, said datum bars each
 (i) extending outwardly from said datum member in a direction opposite the direction in which said other datum bar extends from said datum member,
 (ii) having an end remote from said datum member, and
 (iii) being formed such that the distance of said remote end from said datum member can be selectively adjusted;

(d) plumb bob means attached to and suspended from each of said reference points on said frame, said plumb bob means having a pointed lower end remote from said frame; and, (e) a generally circular target on said remote end of each of said datum bars, each of said targets being operatively associated with one of said plumb bob means and having
 (i) an upper generally horizontally disposed circular planar surface with a centerpoint corresponding to the proper position of said pointed end of said associated plumb bob means when said distance of said target from said datum bar has been adjusted such that said centerpoint corresponds to the proper position of said pointed end of said associated plumb bob means when said frame is in said second shape, and
 (ii) a lower surface,
 said upper and lower surfaces co-terminating at a peripheral edge generally circumscribing said upper and lower surfaces and generally lying in an imaginary horizontally disposed plane, said centerpoint being generally equidistant from each point on said peripheral edge of said target,
 said target permitting the ready visual determination of the spatial relationship of said centerpoint thereof and said pointed end of said plumb bob means operatively associated with said target when a user views said target
 (iii) from a point above said horizontally disposed planar surface and can see said pointed end of said associated plumb bob means, said upper planar surface, said centerpoint, and a portion of said peripheral edge of said target, and
 (iv) from the side of said target and can see said pointed end of said associated plumb bob means and a portion of said peripheral edge of said target and is unable to see said upper planar surface of said target.

2. The apparatus of claim 1, further including (a) an upstanding vertically oriented member, having an upper portion and a lower portion;

(b) an elongate rod
 (i) attached to said lower portion of said vertically oriented upstanding member,
 (ii) extending outwardly from said vertically oriented member,
 (iii) having an end remote from said vertically oriented member and positioned over said circular target on said remote end of said first datum bar; and,
 (iv) having first plumb bob means operatively associated with said circular target of said first datum bar and attached to said remote end thereof and suspended therefrom, said plumb bob means having a pointed lower end remote from said elongate arm, the position of said pointed lower end of said first plumb bob means corresponding to said centerpoint of said circular target of said first datum bar when
 (v) said distance of said target on said first datum bar from said datum member has been adjusted such that said centerpoint thereof corresponds to the proper position of said pointed end of said first plumb bob means when said frame is in said second shape; and, (c) an elongate arm
 (i) attached to said upper portion of said vertically oriented member,
 (ii) extending outwardly from said vertically oriented member, and
 (iii) having second plumb bob means attached thereto and suspended therefrom, said second plumb bob means having a pointed lower end remote from said elongate arm,
 the position of said pointed end of said second plumb bob means attached to said elongate arm corresponding to the desired position of one of said reference points when said frame has been adjusted from said first shape to said second shape and said reference points are in said second orientation with respect to one another.

* * * * *